United States Patent Office.

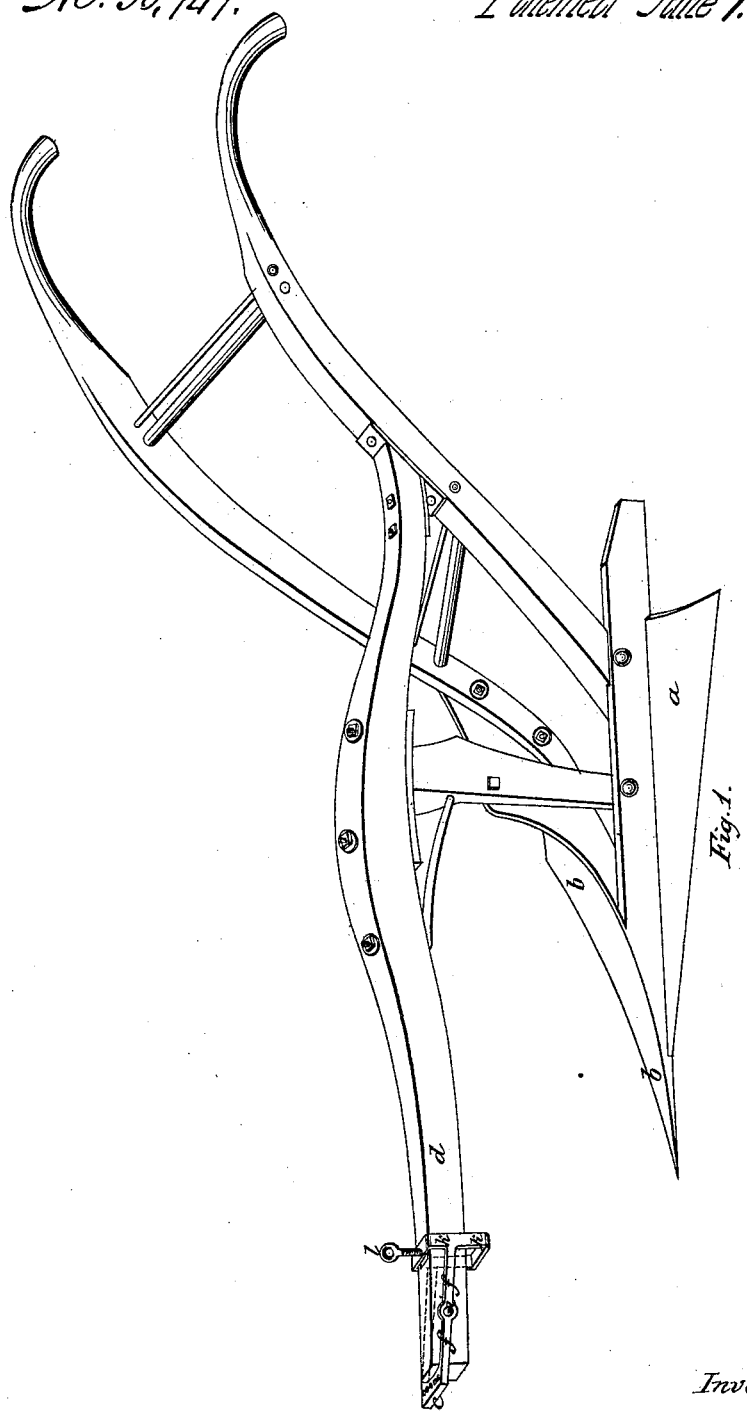

C. HARTZELL, OF ST. JOSEPH, MISSOURI.

Letters Patent No. 90,747, dated June 1, 1869.

IMPROVEMENT IN PLOWS.

The Schedule referred to in these Letters Patent and making part of the same.

*To all whom it may concern:*

Be it known that I, C. HARTZELL, of St. Joseph, in the county of Buchanan, in the State of Missouri, have invented a new and useful Improvement in Plows; and I do hereby declare that the following is a full, clear, and exact description of my invention, reference being had to the accompanying drawing, forming a part of this specification, in which—

Figure 1 is a perspective view of a plow, showing the application of the clevis at the end of plow-beam, and the landside horizontal share, which constitute the most essential features of my invention.

The principal object of my invention and improvement is to plow the ground more effectually than is done with other plows, and to lessen the draught and labor required, and, by means of the horizontal share, or blade, to keep the plow more steady in its action. For this purpose, I have—

First, provided the landside of the plow with a horizontal cutting-blade, or share. This share is of a triangular form, as shown on drawing, the front or sharp point beginning at a point some distance to the rear of the main plowshare-point. From thence the horizontal blade, or share gradually widens toward the rear, to any desired or necessary extent. The object of this share is to cut or horizontally underscore the unplowed land or ground in such a manner that the next turn or passage of the plow will more readily, easily, and evenly turn over the ground already cut or underscored by the horizontal share, thereby lessening the draught and labor. The horizontal blade, or share, in its passage under the solid ground, will tend to steady the plow, while in action.

Secondly, I have provided the end of the plow-beam with a clevis of new and novel construction. Its object is to more effectually regulate the width and depth of the furrows, by means of its horizontal jaw and regulating, or set-screw.

To enable others skilled in the art to make and use my invention, I will proceed to describe it, with reference to the drawings.

Fig. 1 represents a perspective view of a plow, with my improvements.

$a$ is the horizontal blade, or share, on the landside of the plow, and fastened thereto in any suitable manner. Its purpose is to cut or underscore the still solid ground on the landside, and the steadying of the plow while in action.

The share $a$ is flat, and of a triangular shape or form, and sharp on its outer edge, the forward point thereof beginning a small distance to the rear of the main plowshare-point $b$. From thence its horizontal face gradually widens toward the rear, to any desired or necessary extent.

For the purpose of more effectually regulating the width and depth of the furrows, I have provided the plow with a new and novel clevis, whereof $c$ is the horizontal jaw, perforated or provided with suitable holes alongside of one another.

The purpose of this arrangement of jaw and holes is to keep a central draught on the plow-beam $d$, and still alter or change the width of the furrow as desired, by simply changing the draught-hook from one hole to the other.

The jaw $c$ is attached to the plow-beam $d$ by the shanks $f$.

A horizontal pin, or bolt $i$ passes through the shanks $f$ and the plow-beam, and is suitably fastened, forming the connection and fastening of draught-jaw to the beam. The bolt $i$, being round and loose in its bearing, allows the jaw to move vertically, either up or down.

Around the plow-beam $d$, at the rear end, and in connection with the shanks $f$ of the clevis, is the band $k$.

Through the top part of this band passes the regulating, or set-screw $l$, bearing upon a small metal plate on top of the plow-beam. By means of this screw $l$, the band $k$, and consequently the horizontal jaw of the clevis, is either raised or lowered, thereby changing the draught and regulating the depth of the furrow.

What I claim as my invention, and desire to secure by Letters Patent, is—

1. The triangular, elongated, horizontal cutting-blade, or share $a$, attached to the landside of a plow, for the purpose described.

2. The clevis, with a horizontal jaw, $c$, vertically-operating shanks $f$, horizontal draught-pin, or bolt $i$, and the set, or regulating-screw $l$, in combination with one another, substantially as and for the purpose specified.

C. HARTZELL.

Witnesses:
I. W. STEELE,
DAVID BUSH.